United States Patent
Braathen

(10) Patent No.: US 10,663,094 B2
(45) Date of Patent: May 26, 2020

(54) FITTING TO CONNECT WATER PIPES

(71) Applicant: Thor Frölich Braathen, Eggedal (NO)

(72) Inventor: Thor Frölich Braathen, Eggedal (NO)

( * ) Notice: Subject to any disclaimer, the term of this patent is extended or adjusted under 35 U.S.C. 154(b) by 153 days.

(21) Appl. No.: 15/750,939

(22) PCT Filed: Aug. 10, 2015

(86) PCT No.: PCT/NO2015/050133
§ 371 (c)(1),
(2) Date: Feb. 7, 2018

(87) PCT Pub. No.: WO2017/026898
PCT Pub. Date: Feb. 16, 2017

(65) Prior Publication Data
US 2018/0245721 A1    Aug. 30, 2018

(51) Int. Cl.
| F16L 19/02 | (2006.01) |
| F16L 19/028 | (2006.01) |
| F16L 47/10 | (2006.01) |
| F16L 13/14 | (2006.01) |
| F16L 21/00 | (2006.01) |
| F16L 43/00 | (2006.01) |
| F16L 41/02 | (2006.01) |

(52) U.S. Cl.
CPC ......... F16L 19/0286 (2013.01); F16L 13/141 (2013.01); F16L 19/0237 (2013.01); F16L 21/002 (2013.01); F16L 47/10 (2013.01); F16L 41/021 (2013.01); F16L 43/00 (2013.01)

(58) Field of Classification Search
CPC ............... F16L 19/0206; F16L 19/0212; F16L 19/0218; F16L 19/043
See application file for complete search history.

(56) References Cited

U.S. PATENT DOCUMENTS

| 804,149 A | * | 11/1905 | Meyer | ................... F16L 19/04 285/386 |
| 2,412,664 A | * | 12/1946 | Wolfram | ............... F16L 19/083 285/343 |
| 2,458,817 A | * | 1/1949 | Wolfram | ............ F16L 19/0283 285/328 |

(Continued)

FOREIGN PATENT DOCUMENTS

| CN | 202032207 U | 11/2011 |
| CN | 202493819 U | 10/2012 |

(Continued)

OTHER PUBLICATIONS

Mortensen, Tatiana P., "International Search Report", dated Mar. 1, 2016, 3 pages.

*Primary Examiner* — David Bochna
(74) *Attorney, Agent, or Firm* — Winstead PC

(57) ABSTRACT

A fitting to interconnect water pipes or to connect pipes with valves or mountings. The connector housing has an O-ring seat, constituting two walls of a groove for an O-ring. The fitting comprises a clamping sleeve, having a first end provided with a flange, which forms a third wall of the O-ring seat groove. The flange is retained against the coupling housing by a nut screwed by hand onto outer threads on the coupling housing. The clamping sleeve is adapted to be clamped against a pipe which is inserted into the clamping sleeve, and the O-ring seals against the outer surface of the pipe.

10 Claims, 1 Drawing Sheet

(56) References Cited

U.S. PATENT DOCUMENTS

| | | | | |
|---|---|---|---|---|
| 2,466,526 | A | * | 4/1949 | Wolfram ................. F16L 19/12 |
| | | | | 285/104 |
| 3,092,404 | A | * | 6/1963 | MacWilliam ......... F16L 19/028 |
| | | | | 285/334.4 |
| 3,186,740 | A | * | 6/1965 | Lee ......................... F16L 17/00 |
| | | | | 285/101 |
| 3,393,930 | A | | 7/1968 | Ziherl et al. |
| 4,586,735 | A | * | 5/1986 | Innes ................. F16L 19/0212 |
| | | | | 285/354 |
| 5,131,695 | A | * | 7/1992 | Wiser ................. F16L 19/0218 |
| | | | | 285/354 |
| 6,109,660 | A | * | 8/2000 | Akiyama ............ F16L 19/0283 |
| | | | | 285/45 |
| 6,439,478 | B1 | * | 8/2002 | King ....................... B05B 1/207 |
| | | | | 239/261 |
| 2007/0052234 | A1 | * | 3/2007 | Breay ................... F16L 19/005 |
| | | | | 285/354 |
| 2008/0129045 | A1 | | 6/2008 | Shimizu |
| 2013/0113209 | A1 | * | 5/2013 | Neal ..................... F16L 19/065 |
| | | | | 285/354 |

FOREIGN PATENT DOCUMENTS

| | | | |
|---|---|---|---|
| CN | 202733235 | U | 2/2013 |
| DE | 1254414 | B | 11/1967 |
| DE | 9308146 | U1 | 8/1993 |
| DE | 20220837 | U1 | 4/2004 |
| GB | 2129081 | A | 5/1984 |
| JP | H10281367 | A | 10/1998 |
| KR | 101273395 | B1 | 6/2013 |

\* cited by examiner

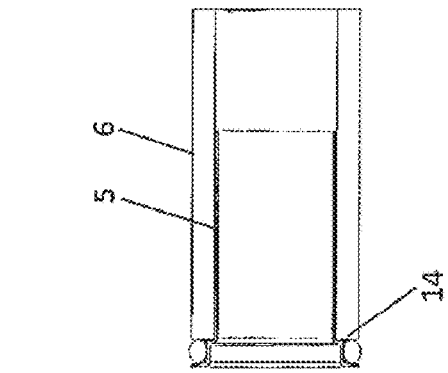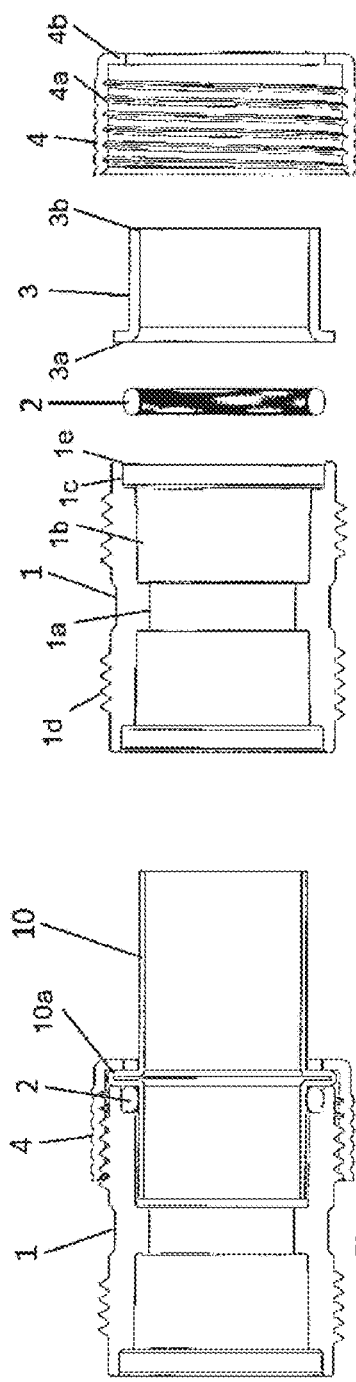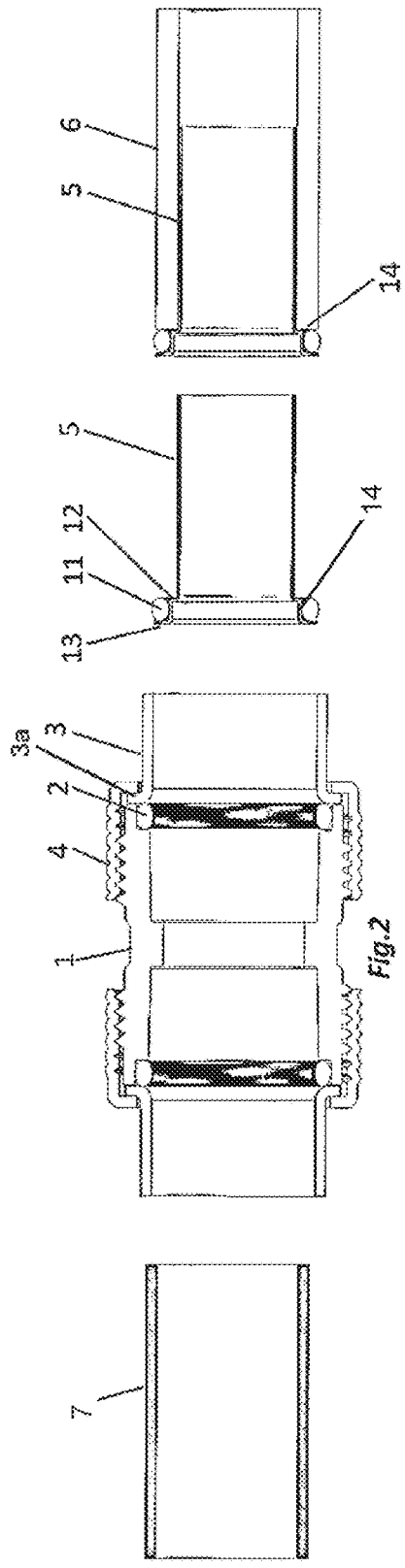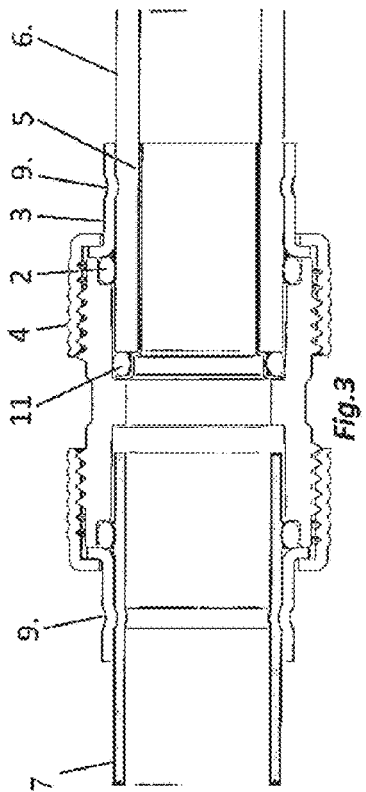

FITTING TO CONNECT WATER PIPES

The present invention relates to an interface for connecting pipes or connecting pipes to valves, especially in conjunction with water pipe connections, as stated in the preamble of the appended claim 1.

BACKGROUND OF THE INVENTION AND PRIOR ART SOLUTIONS

Today's techniques for joining pipes to fittings or valves are mainly based on brass fittings with a conical end and with a nut and a conical clamping ring, where the nut clamps the ring against the taper, which, when the nut is tightened, both form a seal and acts to hold the pipe fixed to the fitting.

Due to deteriorating water quality, low PH and demands for reduced lead content in brass, from the current 2% to 0.2%, the problems caused by stress corrosion increase. The fittings house can rupture at the conical fit, with leaks and thereby water damage as a consequence.

Several years ago regular steel pipes was a good solution, then copper became common, but eventually it turned out that these pipes would not hold more than 20 years. Today metal pipes have been largely replaced with plastic pipes, both inside and outside the house (plumbing and water supply and sewage). Plastic pipes are today recognized as the best and most affordable solution, but it requires other solutions when it comes to fittings and valve connections, for maximum service life and leakage prevention.

There are a significant number of different fitting solutions for such connections. Examples include:

JP410281367 shows an interface where a connector is equipped with an internal groove for an O-ring. A pipe is inserted into the connector and the connector is squeezed against the pipe to lock this in place. This fitting cannot be opened again without cutting the pipe. It is not possible to re-use the connector. It is not possible to use this fitting on a plastic tube, as it will not be possible to attach the plastic tube sufficiently well by squeezing the connector against it.

KR 101273395 shows a fitting of the screw and clamp type, where a pipe end is inserted into the coupling. A nut is arranged around the pipe and screwed to the coupling. A gasket is pressed against the pipe due to a conical surface in the coupling and this clamping action will fixate the tube. It is, however, depending on the nut being screwed sufficiently tight. Too loose tightening may cause leakage. This solution is not suitable for use on plastic pipes unless a support sleeve is used. Even then a leakage may occur.

U.S. Pat. No. 3,393,930 shows a solution where a bead is formed close to the pipe end. This bead is clamped between two fitting elements. A seal seals the connection. This solution requires the use of special tools for making the bead. It is only possible to use metal pipes. The fitting must also be screwed firmly to prevent leakage. The nut must be arranged on the pipe before the forming of the bead. This means that the connection cannot be delivered pre-assembled, and if it is not possible to thread the nut onto the pipe from the other end, the pipe must be produced according to measured length with the nut on the pipe.

CN 202733235 shows an interface, which also has a bead formed close to the tube end. This means that plastic pipes cannot be used. Here too, the fitting has to be screwed firmly to prevent leakage. This solution has the same disadvantages as U.S. Pat. No. 3,393,930.

DE 9308146U also shows a solution in which a bead is formed close to the pipe end. This solution therefore has the same drawbacks as described above.

GB 2129081 describes a solution in which a bead is formed close to the pipe end. The solution is therefore encumbered by the same drawbacks as described above.

THE OBJECTS OF THE INVENTION

The present invention aims to provide a solution for a simple and tight connection of pipes, fittings, and valves. It is an object of the invention facilitate the use of pipes and fittings made of plastic material. However, the invention does not prevent the use of other materials, such as steel, brass or copper.

It is also an object of the invention that the interconnection can take place without any significant stress effect on the connection parts.

This is achieved by the features stated in the appended claim 1.

These objects are also achieved by the features stated in the method of the appended claim 9.

The present invention may be used to provide a firm and tight connection that can withstand the pressure of water, such as hot water, or air at a pressure of up to 60 bar. The fitting is re-openable and it has no tapered seal that can initiate stress corrosion.

As noted above, the primary purpose of the invention to obtain a safe connection between a tube of any size and any material and a housing in the form of fittings or valves, of any dimension and material quality. In particular, it is a purpose to facilitate the use of a fittings—or valve housing that is moulded in plastic. These types of housings are not able to withstand the forces applied by the use of a conical seal.

The plastic material should be of a quality that can withstand a temperature of 10 bar and 180 degrees Celsius. Still these high quality plastic materials have a lower price than brass. Moreover, the quality of plastics is stable. The material is neutral, so that lime deposits on the inside of the housing rarely occurs. Lime deposits can reduce the diameter of the pipes, valves, and fittings. Lime deposits can also obstruct the functioning of valves.

It is also an object that the fitting should not twist the tube during installation. The fitting must be possible to disassemble and then re-assemble, for example. In order to replace a valve or a part of the fitting, such as an O-ring.

Moreover, the fitting should be possible to install using standard plumber tools, such as press tools. The assembled coupling must be substantially free of tensions, except for tensions due to water pressure, and shall not deteriorate during disassembly and subsequent re-assembly. Thereby a fitting is achieved, which in function and quality is at the top of the market at a very affordable price.

DETAILED DESCRIPTION OF A PREFERRED EMBODIMENT

The invention will now be described referring to a specific exemplary embodiment, with reference to the accompanying drawings, where:

FIG. 1 shows a fitting according to the invention split into individual components, FIG. 2 shows the fitting assembled and ready to receive the pipe ends, FIG. 3 shows the pipe ends of two different types of pipes connected to the fitting and FIG. 4 shows a fitting connected to another type of pipe.

FIG. 1 shows an embodiment of the fitting according to the invention split into its components. The fitting comprises a housing 1 having a through bore with different inner diameters, as follows:

Section 1a has a diameter corresponding to inner diameter of the pipe to be connected, Section 1b has a diameter corresponding to the external diameter of the pipe to be connected, and Section 1c has a diameter corresponding to the outside diameter of a first O-ring 2.

The illustrated fitting housing has two identical ends 1e, each with a portion 1b and 1c.

On the outside, the housing has a thread 1d at each end for a nut 4.

The fitting housing 1 can be manufactured by a simple moulding method of the plastic, wherein a non-rotating shaft is placed at each end of the tool, forming sections 1a, 1b and 1c. The outer part of the tool is split along a centre-line and forms the outer shape, including the threads 1d for the nut 4.

Further illustrated, an O-ring 2, which can be made of EPDM (ethylene propylene diene monomer) with peroxide, and the exterior can be coated with silicone for minimum friction. Such an O-ring will withstand high temperatures. However, also other types of rubber, natural or artificial, may be used as suitable.

A clamping sleeve 3 is provided by forming an outwardly projecting flange 3a at one end thereof. At the other end 3b, the pipe is chamfered internally. The clamping sleeve is preferably made of stainless steel.

The nut 4 is preferably also made from a thin stainless tube, with threads 4a formed on the inside, e.g., by rolling. At one end an inwardly extending flange 4b is formed.

FIG. 2 shows pre-assembled the state in which it is intended to supply the fitting. With all the components shown in FIG. 1 factory-assembled, it will be both quicker and easier for the plumber to make a connection with a pipe. Consequently, assembly has taken place where the O-ring 2 is first placed at the interior seat 1c. Then the clamping sleeve 3 is placed against the O-ring 2 and the end 1e of the fitting housing 1. Finally, the nut is mounted over the clamping sleeve 3 and the housing 1, and screwed by hand until it firmly grips the flange 3a of the clamping sleeve 3. The flange 3a thereby forming a third wall for the O-ring 2 and providing a complete support for the O-ring 2. The O-ring will seal against the pipe as will be explained below. As the flange 3a has an outer diameter corresponding to, i.e. is slightly smaller than, the internal thread of the nut 4a, the flange 3a will abut the end 1e of the housing 1. This provides a correct fixed width of the groove for the specific material thickness of the O-ring 2.

In FIG. 2 is also shown a support sleeve 5, which preferably is a thin-walled stainless tube with an increased diameter portion 14 near one end and an outwardly extending flange 13 at the same end. The increased diameter portion 14 forms at, an outer surface, a seat for a second O-ring 11. A transition between the increased diameter portion 14 and the major part of the sleeve 5 forms an abutment surface 12 to rest against the end of a pipe 6. The support sleeve 5 with the second O-ring 11 is mounted within a plastic pipe 6, for example of the type Wirsbo, as explained below.

The second O-ring 11 is mounted on the support sleeve 5 and then the sleeve 5 is inserted into an end of the plastic pipe 6 until the abutment surface 12 abuts the end of the pipe 6. Thus is formed a groove consisting of surfaces of the flange 13, the increased diameter portion 14 and the end of the pipe 6. This groove has a fixed width adapted to the dimension of the O-ring 11. This end of the pipe 6 with the support sleeve 5 is then pushed into the coupling housing 1, as shown in FIG. 3, and as will be explained further below.

At the opposite end of the coupling is shown a pipe 7 made of metal, such as stainless steel, copper, or other metals. How this pipe is connected to the coupling housing 1 will also be explained below.

FIG. 3 shows the coupling housing 1 with its associated parts, O-ring 2, clamping sleeve 3 and nut 4, which have been factory fitted at each end. The plumber has mounted the support sleeve 5 with O-ring 11 into the plastic pipe 6, and then inserted the pipe 6 into the coupling housing until the flange 13 reaches the inner end of the section 1b and abuts the transition to section 1a.

On the opposite side, the left side of FIG. 3, the plumber has inserted a pipe 7 of stainless steel, without a support sleeve. Then he squeezes the clamping sleeves 3 with a pair of pliers, such as of the type "Mannesmann". This results in dented grooves 9, shown in both the clamping sleeves 3. On the inside, this dented groove presses against the pipe 5, 7 and fixates the pipe 5, 7. This way of mounting imposes no twisting of the pipes during the mounting. There is no stress on the fitting irrespective of the materials used.

As shown, the end of the fitting connected to the plastic pipe 6 has two O-ring seals. The fitting end with the metal pipe 7 has one O-ring seal. There is no stress imposed on the plastic coupling housing 1, which in conventional connectors can be a problem.

As will be explained now, a very quick dismantling of the connections can be made, without tools, and without any deterioration of the fitting components. To disassemble, either one side or on both sides of the fitting, all that is needed is to unscrew the nut 4. The nut 4 is tightened by hand at the factory, and will therefore not sit very firmly.

When the nut 4 is unscrewed, it is easy to pull the pipes 6, 7 out of the coupling housing to replace O-rings. The clamping sleeves will now be attached to the pipes, 6, 7, and will follow these when they are pulled out. The nut 4 will sit around the pipe 6, 7, and the clamping sleeve 3 will prevent the nut from sliding off the pipe 6, 7.

There is no need to remove the clamping sleeves 3. The pipes 6, 7 can simply be refitted to the coupling housing 1 with the same clamping sleeves 3 and the same nuts 4. The nut 4 will be tightened by hand again.

This means that replacement of O-rings and valves can be done without any use of tools.

A fitting according to the present invention has been tested at a pressure of 60 bar without showing any weakness.

FIG. 4 illustrates that the coupling also can be used together with a pipe 10 in which there is formed a bead 10a on the pipe 10. This results in a fitting similar to some of the prior art described above. In this case, the coupling housing 1 is provided with an O-ring 2, but is not equipped with a clamping sleeve 3. Instead, a third wall of the O-ring groove is formed by the bead 10a of a prefabricated pipe made of a thin stainless steel or copper material. In an additional rolling operation, the bead 10a of this pipe 10 forms a double wall where one side supports the O-ring 2, and the other side abuts the nut 4.

The fitting of the invention may be a connector for connecting two pipes, or it can be part of a valve to which one or more pipes can be connected.

The invention claimed is:

1. A fitting to interconnect water pipes or to connect pipes with valves or mountings, the fitting comprising:

a coupling housing;

an O-ring;
a nut;
wherein the coupling housing comprises:
   an internal bore in which at the end of the bore is formed an O-ring seat, constituting two walls of a groove for the O-ring; and
   an external thread on which the nut is received;
a clamping sleeve comprising a first end provided with a flange, said flange forming a third wall of the O-ring seat groove, the flange being retained against the coupling housing by the nut, the clamping sleeve being adapted to be clamped against a pipe which is inserted into the clamping sleeve, and that the O-ring, when the pipe is mounted, seals against the outer surface of the pipe;
wherein the clamping sleeve is fixated to the coupling housing by the nut before the pipe is inserted into the clamping sleeve; and
wherein the pipe is fixated to the fitting via squeezing of the clamping sleeve forming a groove in the clamping sleeve.

2. The fitting according to claim 1, wherein the coupling housing bore has a portion axially inside of the O-ring seat having a diameter corresponding to the pipe outer diameter.

3. The fitting according to claim 2, wherein the coupling housing bore has a portion axially inside of the portion of a diameter corresponding to the pipe outer diameter, having a diameter corresponding to the pipe internal diameter.

4. The fitting according to claim 1, comprising a supporting sleeve which is adapted to be inserted into the pipe and that the supporting sleeve has a flange at its outer end with an outer diameter corresponding the pipe outer diameter.

5. The fitting according to claim 4, wherein the flange forms a part of a seat for a second O-ring, located between the tube end and the flange.

6. The fitting according to claim 5, wherein the support sleeve has a radial abutment surface for bearing against the pipe end, the pipe end, the flange and a cylindrical portion of the sleeve forming the walls of a groove with fixed width for the second O-ring.

7. The fitting according to claim 1, wherein the coupling housing and the nut is made of a plastic material.

8. The fitting according to claim 1, wherein the coupling housing is a part of a connector piece, a valve, a T-piece, or an elbow.

9. A method of providing connection of a coupling housing and a pipe, wherein the coupling housing has an internal bore where, at the outer end of the bore is formed an O-ring seat, constituting two walls of a groove for an O-ring, and having an external thread for receiving a nut, the method comprising:
   placing the O-ring in the O-ring seat;
   placing a clamping sleeve having a flange with the flange towards the O-ring;
   screwing the nut onto the external thread by hand until the flange is clamped between the nut and the coupling housing;
   inserting the pipe through the clamping sleeve and into the coupling housing and bringing the outer surface of the pipe to bear against the O-ring;
   squeezing the clamping sleeve to fixate the clamping sleeve onto the pipe; and
   wherein the squeezing forms a groove in the clamping sleeve.

10. The method of claim 9, wherein the squeezing of the clamping sleeve is performed via clamping pliers.

* * * * *